No. 668,079. Patented Feb. 12, 1901.
H. W. BAKER.
CONVEYER.
(Application filed Apr. 30, 1900.)
(No Model.)
Fig. 1.
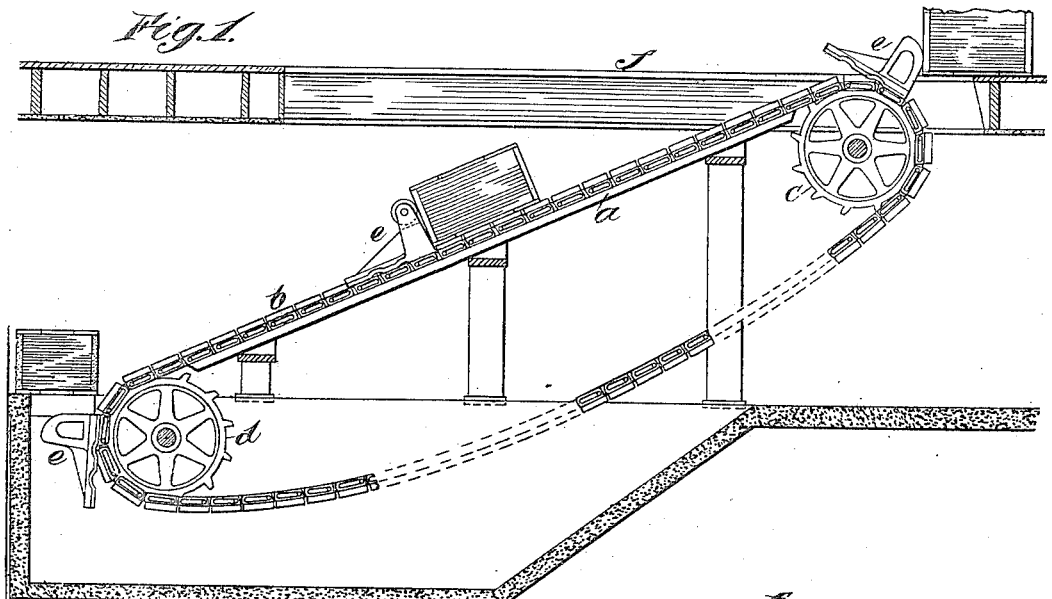
Fig. 2.
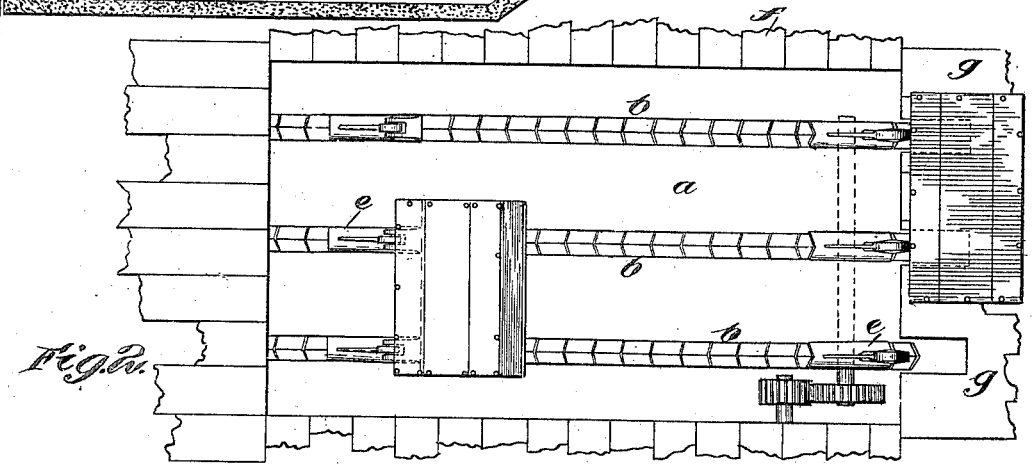
Fig. 3.
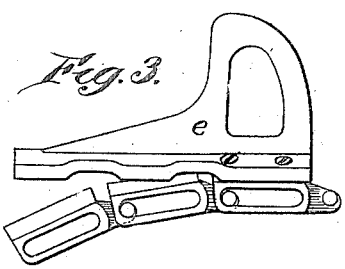
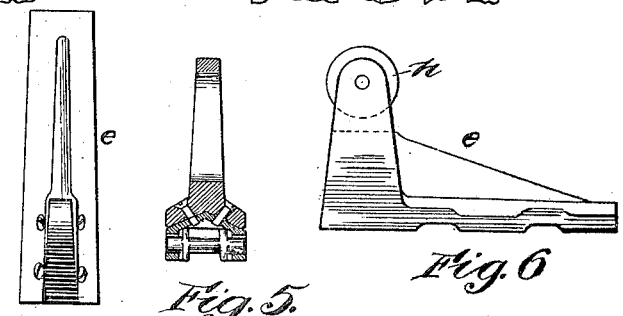
Fig. 4. Fig. 5. Fig. 6.
Witnesses:
J. W. Skinkle
A. Lynn Lawrence
Inventor:
Howard W. Baker
by George P. Barton,
Atty.

UNITED STATES PATENT OFFICE.

HOWARD W. BAKER, OF CHICAGO, ILLINOIS.

CONVEYER.

SPECIFICATION forming part of Letters Patent No. 668,079, dated February 12, 1901.

Application filed April 30, 1900. Serial No. 14,811. (No model.)

*To all whom it may concern:*

Be it known that I, HOWARD W. BAKER, a citizen of the United States, residing at Chicago, in the county of Cook and State of Illinois, have invented a certain new and useful Improvement in Conveyers, (Case No. 1,) of which the following is a full, clear, concise, and exact description.

My invention relates to improvements in conveyers, and has for its object the provision of apparatus designed to operate more efficiently than those hitherto employed in the art, especially in the particulars of securing automatic delivery and of preventing breakage or damage to the various classes of articles conveyed.

More particularly, my invention may be said to relate to conveyers adapted for raising heavy or bulky articles by means of endless conveying devices operating upon an incline along which the said articles are moved and elevated.

A device of the same general type as known in the prior art may be briefly described as consisting of an incline or way extending from the receiving-level to a point some distance above the delivering-level, the said incline being provided with several continuously-driven endless chains moving toward the delivering end of the incline. Upon these chains are disposed at suitable intervals straight arms or shoulders, extending at right angles from their respective chains, adapted to engage and support the article to be elevated. At the delivering end the incline is carried some distance above the floor-level and is provided with an abrupt downward slope, which is required in order that the article that is being elevated may be disengaged from the supporting-arms upon the chains quickly enough to clear said arms before they turn to move with their associated chains in a reverse direction. With this type of apparatus, however, it is necessary that one or more workmen be stationed at the delivering end of the conveyer to promptly remove all articles elevated in order that those following may be successively delivered. Moreover, the slipping or fall of the article down the abrupt slope is frequently accompanied by a racking of the containing-crate or breakage of the articles themselves. If by accident the articles are not removed from the point of delivery with sufficient promptness, the next succeeding article will be caught between the one previously delivered and the conveyer-arms, so that breakage either of the article or the conveyer is almost certain to occur when the arms turn to move in a reverse direction. These disadvantages my improvements have eliminated from the operation of a conveyer. These improvements I may briefly refer to as consisting in lowering the incline, so that its delivering end is substantially that of the delivering floor or level, and, further, in providing upon the conveyer-chains shoulders or arms having curved engaging faces of suitable form which are adapted to support and automatically deliver upon the delivery-level articles that are being elevated.

The features of my invention will be more readily appreciated by reference to the accompanying drawings, illustrating an embodiment of my invention, wherein—

Figure 1 is a side elevation of the conveyer. Fig. 2 is a plan view thereof. Fig. 3 is a side elevation of one of the conveyer arms or supports, shown slightly exaggerated in relative size in the preceding figures for the sake of clearness. Fig. 4 is a plan view thereof. Fig. 5 is a vertical sectional view showing the manner of its attachment to the conveyer-chain, and Fig. 6 is a side elevation of a modified form of conveyer arm or support.

The same letters of reference are employed to designate similar parts in each of the several figures of the drawings.

The incline $a$ is provided with three endless chains or conveyers $b$, which are carried upon sprocket-wheels $c$ $d$, located, respectively, at the top and bottom of the incline. Power is applied to the shaft of the upper sprocket-wheels $c$ in any desired manner. These wheels mesh with their respective chains and serve to move them upwardly along the incline. As shown in the drawings, the chains are carried upon the surface of the incline and serve to support the article, such as a box or crate, and carry it forward with the movement of the chains. At suitable intervals throughout the length of these chains are provided arms $e$, having curved surfaces which extend angularly from the chains and serve to support the articles to be elevated and cause them to move forward with the chains. The delivery floor or level $f$ is substantially flush with the upper end of the incline and is provided with a smooth receiving-plate $g$, of iron or steel, suitably slotted to permit the passage of the chains and supporting-arms when their direction of movement is altered at the top of the incline. Two forms of these arms are shown in the drawings, one being provided with a stationary and the other with a rotatable curved engaging face. These arms are rigidly screwed or bolted to individual links of the chain and have free ends extending backward and serving to brace or support the arms upon the immediately-succeeding links. By reason of the curved engaging faces provided upon said arms they are adapted, when reaching the delivery-point of the incline, to effect an automatic delivery of the box or crate, pushing it forward upon the receiving-plate sufficiently to clear it from said arms and permit their passage through the slots or openings. With arms having straight or substantially straight engaging faces this action will not occur, inasmuch as when the said arms are passing over their sprocket-wheels their outer ends move more rapidly than the chains, and by reason of this the crate or article being elevated, if not promptly removed from the delivery end of the incline, is not advanced sufficiently by the arms to clear them, and either the apparatus or the article itself is likely to be damaged.

The conveyer arm or support shown in Fig. 3 and succeeding figures is provided with a curved engaging face similar to a parabola, although other forms of curved engaging faces conforming to a segment of a circle or hyperbola may readily be employed. This type of arm or support upon reaching the extremity of its movement, it will be seen, acts as a cam and automatically delivers the box, crate, or other article which has been carried upon the conveyer-chain.

The action of the conveyer-arm of Fig. 6 will at once be appreciated, wherein the engaging face takes the form of a roller $h$, rotatably mounted at the end of said arm, which roller is adapted to act in substantially the same manner as that of the other form of conveyer-arm shown and described.

It will be seen that in my improved construction the abrupt slope at the delivery end of the conveyer may be entirely done away with, thereby shortening the length of the incline or reducing the angle thereof, thus securing a saving of power in operating the conveyer. This construction eliminates as well the chances of breaking the articles conveyed when the same are delivered some distance above the level $f$, as has been the practice in the prior art. Moreover, in my improved construction it is not necessary that the crates or other articles which are elevated be immediately removed from the delivery end of the conveyer, inasmuch as they will be successively delivered or pushed out of the way by the operation of the apparatus.

Ordinarily I prefer to employ the conveyer-arm shown in Fig. 3, although other forms differing therefrom may be advantageously employed.

I have shown and described herein the preferred embodiment of my invention, although it will be readily appreciated that various modifications may be made in the same without departing from the spirit thereof, and I do not desire to be understood as limiting myself to the precise apparatus herein set forth.

I therefore claim, and desire to secure by these Letters Patent, the following:

1. The combination with an incline, of an endless conveyer, means for moving the same forward along the incline, and an arm or support rigidly mounted upon the said conveyer, having a curved engaging face adapted to support the article upon the incline and automatically deliver the same at the upper end of the incline, substantially as described.

2. In apparatus of the class described, the combination with an incline extending substantially from the receiving to the delivering level, of a traveling conveyer provided thereon, and a supporting arm or arms rigidly mounted upon said traveling conveyer, adapted to effect the automatic delivery of the articles conveyed at the delivering-level, substantially as described.

3. In a conveyer of the class described, the combination with an inclined way $a$ extending from the receiving-level to approximately the delivering-level $f$, of a traveling conveyer chain or chains $b$ provided thereon, means for actuating said chain or chains, a plurality of supporting-arms $e$ rigidly mounted upon the conveyer-chains, the said arms having curved engaging faces for effecting the automatic delivery of the article conveyed at the delivering-level $f$, substantially as described.

4. In a conveyer of the class described, the combination with an inclined way, of an endless traveling-conveyer device moving upon said way, a power-driven wheel or wheels for imparting movement to said conveyer device, and supporting-arms rigidly mounted at intervals upon the conveyer device, and having curved engaging faces adapted to support the article conveyed and to effect its automatic delivery at the upper end of the conveyer, substantially as described.

5. The combination, with an inclined way extending substantially from the receiving to the delivering level, of a traveling conveyer, a power-driven wheel or wheels adapted to actuate the said conveyer to move upwardly along the incline, and a plurality of supporting-arms rigidly mounted at intervals upon the traveling conveyer, adapted to receive the articles conveyed, said arms being provided with curved supporting-faces adapted to effect the automatic delivery of the articles at the upper level of the incline, substantially as described.

6. In a conveyer of the class described, the combination with an inclined way $a$, of an endless chain or conveyer device $b$, means for moving the same upward along the inclined way, and a plurality of arms or supports $e$ secured to said chain at intervals, the said arms having curved engaging faces adapted to support the article conveyed and automatically deliver the same at the upper end of the incline, substantially as described.

7. In a conveyer of the class described, the combination with an inclined way $a$ extending from the receiving-level to the delivering-level $f$, of a traveling conveyer chain or chains $b$, means for moving the same along the incline, and a plurality of supporting-arms $e$ secured at intervals to the chain or chains, said arms having curved engaging faces and being adapted to act as cams at the delivering-level, whereby articles elevated or conveyed are automatically delivered and released from said arms, substantially as described.

8. In a conveyer or elevating incline, the combination with an inclined way $a$ extending from the receiving-level to the delivering-level $f$, of a plurality of conveyer-chains $b$, meshing sprocket-wheels $c$ $d$ adapted to engage and actuate the said conveyer-chains, and a plurality of supporting-arms $e$ disposed at intervals along the conveyer-chains, adapted to receive the articles conveyed, said arms being provided with stationary curved supporting-faces adapted to act as cams and effect the automatic delivery of the articles at the level $f$, substantially as described.

In witness whereof I hereunto subscribe my name this 27th day of April, A. D. 1900.

HOWARD W. BAKER.

Witnesses:
  W. W. LEACH,
  ALBERT LYNN LAWRENCE.